US011620672B2

(12) United States Patent
Smrzlic et al.

(10) Patent No.: US 11,620,672 B2
(45) Date of Patent: Apr. 4, 2023

(54) VALIDATING DIGITAL CONTENT PRESENTED ON A MOBILE DEVICE

(71) Applicant: Codebroker, LLC, Belmont, MA (US)

(72) Inventors: Pero Smrzlic, Leesburg, VA (US); Daniel Slavin, Belmont, MA (US)

(73) Assignee: Codebroker, LLC, Belmont, MA (US)

( * ) Notice: Subject to any disclaimer, the term of this patent is extended or adjusted under 35 U.S.C. 154(b) by 0 days.

(21) Appl. No.: 17/324,804

(22) Filed: May 19, 2021

(65) Prior Publication Data

US 2021/0272151 A1   Sep. 2, 2021

Related U.S. Application Data

(63) Continuation of application No. 15/848,303, filed on Dec. 20, 2017, now abandoned, which is a
(Continued)

(51) Int. Cl.
*G06Q 30/02* (2012.01)
*G06Q 20/34* (2012.01)
(Continued)

(52) U.S. Cl.
CPC ..... *G06Q 30/0235* (2013.01); *G06Q 20/1235* (2013.01); *G06Q 20/322* (2013.01); *G06Q 20/342* (2013.01)

(58) Field of Classification Search
CPC ........... G06Q 30/0235; G06Q 20/1235; G06Q 20/322; G06Q 20/342; G06Q 30/0207–0277
See application file for complete search history.

(56) References Cited

U.S. PATENT DOCUMENTS

| 4,720,860 A | 1/1988 | Weiss |
| 4,856,062 A | 8/1989 | Weiss |

(Continued)

FOREIGN PATENT DOCUMENTS

WO   2001091398 A2   11/2001

OTHER PUBLICATIONS

Final office Action Received for U.S. Appl. No. 15/200,145 dated Jun. 27, 2017, 58 pages.
(Continued)

*Primary Examiner* — Chinyere Mpamugo
(74) *Attorney, Agent, or Firm* — Patent GC LLC

(57) ABSTRACT

A computer system includes a content delivery system that delivers digital content from a source to a mobile device, which in turn presents the digital content to a recipient computer system. The recipient computer system can validate that the digital content presented by the mobile device is authorized by the source of that digital content without the recipient computer system communicating with the content delivery system for such validation. Digital content presented on a mobile phone can be validated by a recipient as being authorized by a source, without a connection to a centralized database. To perform such validation, the computer system uses i) a transaction location determined at the time of a transaction based on information received from the mobile device, and ii) a time-varying, non-predictable code associated with the transaction location.

9 Claims, 7 Drawing Sheets

Related U.S. Application Data continuation of application No. 15/200,145, filed on Jul. 1, 2016, now abandoned.

(60) Provisional application No. 62/313,847, filed on Mar. 28, 2016.

(51) Int. Cl.
  *G06Q 20/32* (2012.01)
  *G06Q 20/12* (2012.01)
  *G06Q 30/0235* (2023.01)

(56) References Cited

U.S. PATENT DOCUMENTS

| | | |
|---|---|---|
| 4,885,778 A | 12/1989 | Weiss |
| 4,998,279 A | 3/1991 | Weiss |
| 5,023,908 A | 6/1991 | Weiss |
| 5,058,161 A | 10/1991 | Weiss |
| 5,097,505 A | 3/1992 | Weiss |
| 5,168,520 A | 12/1992 | Weiss |
| 5,237,614 A | 8/1993 | Weiss |
| 5,361,062 A | 11/1994 | Weiss et al. |
| 5,367,572 A | 11/1994 | Weiss |
| 5,485,519 A | 1/1996 | Weiss |
| 5,523,794 A | 6/1996 | Mankovitz et al. |
| 5,657,388 A | 8/1997 | Weiss |
| 6,130,621 A | 10/2000 | Weiss |
| 6,985,583 B1 | 1/2006 | Brainard et al. |
| 7,006,983 B1 | 2/2006 | Packes et al. |
| 7,237,117 B2 | 6/2007 | Weiss |
| 7,363,494 B2 | 4/2008 | Brainard et al. |
| 7,502,933 B2 | 3/2009 | Jakobsson et al. |
| 7,730,518 B2 | 6/2010 | Jakobsson et al. |
| 7,805,372 B2 | 9/2010 | Weiss |
| 7,809,651 B2 | 10/2010 | Weiss |
| 7,979,707 B2 | 7/2011 | Rostin et al. |
| 8,001,055 B2 | 8/2011 | Weiss |
| 8,234,220 B2 | 7/2012 | Weiss |
| 8,271,397 B2 | 9/2012 | Weiss |
| 8,538,881 B2 | 9/2013 | Weiss |
| 8,577,813 B2 | 11/2013 | Weiss |
| 8,613,052 B2 | 12/2013 | Weiss |
| 8,856,539 B2 | 10/2014 | Weiss |
| 8,966,276 B2 | 2/2015 | Nanopoulos et al. |
| 9,100,826 B2 | 8/2015 | Weiss |
| 10,102,356 B1* | 10/2018 | Sahin .................. G06F 21/6218 |
| 2001/0049627 A1 | 12/2001 | Simpson |
| 2002/0046169 A1 | 4/2002 | Keresman, III et al. |
| 2002/0095344 A1 | 7/2002 | Mares |
| 2003/0182242 A1 | 9/2003 | Scott et al. |
| 2004/0129469 A1 | 7/2004 | Kader |
| 2005/0038724 A1 | 2/2005 | Roever et al. |
| 2005/0149759 A1 | 7/2005 | Vishwanath et al. |
| 2005/0240473 A1 | 10/2005 | Ayers et al. |
| 2006/0194569 A1 | 8/2006 | Hsueh |
| 2007/0174259 A1 | 7/2007 | Amjadi |
| 2008/0118041 A1 | 5/2008 | Finogenov |
| 2008/0162227 A1 | 7/2008 | Jakobsson et al. |
| 2008/0223918 A1 | 9/2008 | Williams et al. |
| 2009/0076912 A1 | 3/2009 | Rajan et al. |
| 2010/0174610 A1 | 7/2010 | Del Real |
| 2010/0312634 A1 | 12/2010 | Cervenka |
| 2011/0028160 A1 | 2/2011 | Roeding et al. |
| 2011/0029359 A1 | 2/2011 | Roeding et al. |
| 2011/0029362 A1 | 2/2011 | Roeding et al. |
| 2011/0029364 A1 | 2/2011 | Roeding et al. |
| 2011/0029370 A1 | 2/2011 | Roeding et al. |
| 2011/0040691 A1 | 2/2011 | Martinez et al. |
| 2011/0099384 A1 | 4/2011 | Grange et al. |
| 2011/0106600 A1 | 5/2011 | Malik et al. |
| 2011/0106605 A1 | 5/2011 | Malik et al. |
| 2011/0106606 A1 | 5/2011 | Thordsen et al. |
| 2011/0208599 A1 | 8/2011 | Sen et al. |
| 2011/0225417 A1 | 9/2011 | Maharajh et al. |
| 2011/0251892 A1 | 10/2011 | Laracey |
| 2011/0302017 A1 | 12/2011 | Marti et al. |
| 2012/0101887 A1 | 4/2012 | Harvey et al. |
| 2012/0226542 A1 | 9/2012 | Blosser et al. |
| 2012/0233682 A1 | 9/2012 | Finogenov |
| 2013/0073372 A1 | 3/2013 | Novick et al. |
| 2013/0073423 A1 | 3/2013 | Allen et al. |
| 2013/0085835 A1* | 4/2013 | Horowitz ........... G06Q 30/0207 |
| | | 705/14.1 |
| 2013/0204690 A1 | 8/2013 | Liebmann |
| 2013/0297416 A1 | 11/2013 | Dipaola et al. |
| 2013/0304555 A1 | 11/2013 | Groarke |
| 2013/0339238 A1 | 12/2013 | Unland et al. |
| 2014/0006134 A1 | 1/2014 | Lin et al. |
| 2014/0067605 A1 | 3/2014 | Schwab |
| 2014/0081729 A1 | 3/2014 | Ocher |
| 2014/0122202 A1 | 5/2014 | Shugart et al. |
| 2014/0207552 A1 | 7/2014 | Blosser |
| 2014/0222689 A1 | 8/2014 | Keresman, III et al. |
| 2014/0297669 A1 | 10/2014 | Rajakarunanayake et al. |
| 2014/0344043 A1 | 11/2014 | Hennessy et al. |
| 2014/0365476 A1 | 12/2014 | Rajakarunanayake et al. |
| 2015/0186871 A1* | 7/2015 | Laracey ............ G06Q 30/0226 |
| | | 705/41 |
| 2015/0235212 A1 | 8/2015 | Ortiz et al. |
| 2015/0281231 A1 | 10/2015 | Ganesan |
| 2015/0302398 A1 | 10/2015 | Desai et al. |
| 2015/0302402 A1 | 10/2015 | Chan Chi Yuen |
| 2015/0358819 A1 | 12/2015 | Dipaola |
| 2015/0379524 A1 | 12/2015 | Løken |
| 2016/0012465 A1* | 1/2016 | Sharp .................. G06Q 20/321 |
| | | 705/14.17 |
| 2016/0019536 A1 | 1/2016 | Ortiz et al. |
| 2016/0048865 A1 | 2/2016 | Poon |
| 2017/0278127 A1 | 9/2017 | Smrzlic et al. |
| 2018/0268432 A1 | 9/2018 | Smrzlic et al. |

OTHER PUBLICATIONS

Non Final Office Action received for U.S. Appl. No. 15/848,303 dated Apr. 2, 2020, 8 Pages.

Non-Final Office Action received for U.S. Appl. No. 15/200,145 dated Sep. 21, 2016, 19 Pages.

U.S. Patent and Trademark Office, "Final Office Action", U.S. Appl. No. 15/848,303, dated Jan. 29, 2021, 27 Pages.

* cited by examiner

800 User Profile

| 802 | 804 | 806 | 808 | 810 | 812 |
|---|---|---|---|---|---|
| ID | Name | Address | City | Zip | Other |

840 Coupon Table

| 842 | 844 | 846 | 848 | 850 |
|---|---|---|---|---|
| ICUID | Start date | End date | Other | Other |

860 User/Coupon Association

| 862 | 864 |
|---|---|
| ID | ICUID 1 |

880 Coupon Identifier Table

| 882 | 886 |
|---|---|
| ICUID | Coupon ID |

890 Token Profiles

| 892 | 894 | 896 | 898 | 899 |
|---|---|---|---|---|
| Token ID | Type | Retailer ID | Location | Other data |

FIG. 2

VALIDATING DIGITAL CONTENT PRESENTED ON A MOBILE DEVICE

CROSS-REFERENCE TO RELATED APPLICATIONS

This application is a continuation of U.S. patent application Ser. No. 15/848,303, filed Dec. 20, 2017, currently pending, which is a continuation of U.S. patent application Ser. No. 15/200,145, filed Jul. 1, 2016, abandoned, which is a nonprovisional application of U.S. Provisional Patent Application Ser. No. 62/313,847, filed Mar. 28, 2016, expired, which are hereby incorporated by reference.

BACKGROUND

Coupons today come in two broad varieties. Generic coupons, all of which have a common identifier, such as a barcode number, associated with them, and serialized or one-time-use coupons, each of which has a unique identifier, such as a barcode number.

There are several advantages of generic coupons. They are easy to distribute and can be redeemed in multiple locations. For a retailer to accept generic coupons, there is little or no change required in information technology infrastructure, and no requirement for a real-time connection from a retailer's point of sale system to a third party system to validate the coupons. Many consumer packaged goods (CPG) companies, or manufacturers, use generic coupons because of these advantages. Generic coupons are typically distributed as paper coupons. A $1 off paper coupon for Tide detergent issued by Proctor and Gamble is an example of a generic coupon.

When paper versions of these generic coupons are presented to a retailer as part of transactions, the retailer collects the paper coupons, ensuring that the paper coupons cannot be used again. The retailer sends the paper coupons that have been redeemed through that retailer to a coupon clearing service. The coupon clearing service processes the paper coupons to determine what amount of money is owed to the retailer. The coupon clearing service also can transfer funds to the retailer and can assess charges to the CPG companies who issued the coupons.

This process works well for paper coupons, but does not work at all for digital coupons for several reasons. In particular, there is nothing for the retailer to deliver to a conventional coupon clearing service. For example, if a consumer presents a digital coupon on a mobile phone, the retailer has no paper version of the digital coupon to send to a conventional coupon clearing service. As a result, the retailer may refuse the coupon, or the retailer might not be reimbursed by the manufacturer for the discount given to the consumer. Thus, digital coupons are more commonly used by retailers, for use in their own stores, and are not as commonly used by manufacturers.

The CPG companies, or manufacturers, face a similar problem. They would like to be able to issue digital coupons to be used by consumers in any locations that accept paper coupons, but they need to make sure that they are only reimbursing retailers for coupons that were actually presented by consumers, to reduce fraud by the retailer.

One way that some CPG companies have tried to use digital coupons is to have digital coupons that time out after a short period of time. For example, once a consumer clicks a button to display a digital coupon on a mobile device, the digital coupon remains active for a short period of time, such as two minutes. After that time, the digital coupon is disabled. While using a time out on a digital coupon can ensure that the digital coupon is presented only once, there are measures that can be taken to defeat the time out. Also, using the time out does not verify that both a product was purchased and the digital coupon was redeemed at the same time. Using a time out also does not address the retailer's challenge of knowing that the retailer will be reimbursed by the CPG company for the digital coupon the retailer accepted, i.e., that the CPG company has authorized the digital coupon.

Another way for CPG companies to reduce retailer fraud, and for retailers to ensure they will be reimbursed for manufacturer coupons, is to use serialized, or one-time-use digital coupons. In the case of serialized coupons, each coupon has its own unique identifier, usually presented in the form of a barcode. The unique identifier ensures that no two coupons are alike. When the consumer presents a one-time use digital coupon at a retailer, the retailer can check, by accessing a centralized database of active serialized coupons, to determine if the digital coupon is valid. If the digital coupon is valid, then the retailer can accept the digital coupon, and the centralized database is updated to indicate that the digital coupon has been redeemed. This process ensures that a) the retailer gets credit for redeeming the coupon and b) that no one else can redeem the same coupon. The CPG companies know the coupon will be redeemed only once, thus reducing the likelihood of multiple use fraud. Retailers know they also will receive payment for the one-time use digital coupons redeemed through them.

For serialized digital coupons to work using this technique, the retailer's point of sale system has a real-time connection to the centralized database to validate the one-time use digital coupon and to update the database at the time of the transaction in which the digital coupon is redeemed. In the case of a small merchant with merely a cash register, there is typically no connectivity to such a centralized database. In the case of a large merchant with a sophisticated point of sale system, the process of integration with a centralized database can involve customization of the point of sale system, which introduces complexity, cost, and risk, both for installation and ongoing maintenance, and is time consuming and expensive.

SUMMARY

This Summary introduces selected concepts in simplified form and which are described further below in the Detailed Description. This Summary is intended neither to identify key or essential features of the claimed subject matter, nor to limit the scope of the claimed subject matter.

A computer system includes a content delivery system that delivers digital content from a source to a mobile device, which in turn presents the digital content to a recipient computer system. The recipient computer system can validate that the digital content presented by the mobile device is authorized by the source of that digital content without the recipient computer system communicating with the content delivery system for such validation. For example, using such a computer system, a digital coupon presented on a mobile phone can be validated by a retailer as being authorized by a coupon issuer, such as a manufacturer, without the retailer having a point-of-sale system with a connection to a centralized database.

To perform such validation, the computer system uses i) a transaction location determined at the time of a transaction based on information received from the mobile device, and ii) a time-varying, non-predictable code associated with the transaction location. The transaction location can be a geographic location, such as a location determined for the mobile device, or an identity of a recipient, such as a retailer or a retailer's point-of-sale device or a retailer's online store, to whom or to which the digital content is presented by the mobile device. Time-varying, non-predictable codes can be associated with transaction locations, such as geographical locations, or with identities of potential recipients, such as retailers, or both.

More particularly, the content delivery system has access to a server computer that generates time-varying non-predictable codes associated with potential transaction locations. The potential recipients of the digital content also have corresponding tokens that generate corresponding time-varying non-predictable codes. Thus, for a potential transaction location, there is a time-varying non-predictable code that can be generated both by the server, given the transaction location as an input, and by the token for the recipient at that transaction location.

When the content delivery system receives a request from a mobile device for digital content associated with a source, the content delivery system determines a transaction location based on information received from the mobile device. The content delivery system, using the transaction location, accesses the server computer to obtain a current token value for a token corresponding to the transaction location. A current token value is generated based on the time-varying non-predictable code associated with the transaction location. The content delivery system then sends the current token value to the mobile device. When the mobile device presents the digital content, the presented digital content includes the server-generated current token value. The recipient's token at the transaction location generates a current token value based on the time-varying, non-predictable code that is part of the token. The token can presents the token-generated current token value on an output device associated with the token. A comparison of the token-generated current token value and the server-generated current token value as presented by the mobile device determines whether the digital content is authorized by the source for presentation at this transaction location.

Such a computer system allows the recipient to validate that the digital content presented by the mobile device is authorized by the source, even when the recipient's computer system is not in communication with the content delivery system. For example, the point of sale system, or the cashier using the point of sale system, at a retailer, which processes a digital coupon presented on a mobile device, can validate that the digital coupon is authorized by the manufacturer by a comparison of the token-generated time-varying non-predictable code from the retailer's token with the server-generated time-varying non-predictable code presented with the digital coupon on the mobile device.

In one implementation, to provide such functionality, a device called a token, an example of which is a RSA SecureID token, is distributed to a retailer by a coupon issuer, such as a manufacturer of a product or a coupon delivery service. In one implementation, such a token can include a physical token with a display that presents a value (the token value) on the display. In another implementation, such a token can be integrated into a point of sale system, such as the Square point of sale system. In another implementation, such a token can be a computer program executing on a computer connected to, or implementing, the point of sale system. In general, the token at a transaction location generates a time-varying non-predictable code which matches the corresponding time-varying non-predictable code for that transaction location generated by a server computer accessible to the content delivery system.

As an example use, when a purchaser presents a generic digital coupon for use in a transaction with a retailer, the purchaser uses an application on a mobile device, such as a web browser or mobile app, to present the generic digital coupon at the retailer's point of sale system. The application communicates with a coupon delivery system to access the digital coupon. The application gathers information that can be used to determine the transaction location. For example, the application can access information from a global positioning system (GPS) circuit in the mobile device. As another example, the application can access information from cellular network, wireless computer network or other network connectivity information. As another example, the application can access other information from the environment of the mobile device, such as a Bluetooth beacon placed near or at a register or other point-of-sale device and which provides the primary location information for the retailer. As another example, information, such as a number or QR code, provided near or at the register or other point-of-sale device can be input to the mobile device, such as by using a camera or through manual input. For transactions with an online store, a uniform resource identifier or locator for the online store can be provided. Such information obtained by the application from the mobile device can be used to determine the geographic location of the mobile device. In particular, the geographic location of the mobile device can be determined by the application, or the application can send this information to a coupon delivery system which in turn can determine the geographic location of the mobile device.

The information from which the geographic location of the mobile device can be determined can be used to determine a transaction location, which can be, for example, a geographic location or an identifier of a physical store or an online store. The coupon delivery system accesses information which associates transaction locations with token identifiers, in order to identify a token(s) associated with the current transaction location. For example, the coupon delivery system can determine, based on the transaction location, a token that has been assigned to that transaction location.

If the transaction location has a token assigned to it, then the coupon delivery system can prepare to send a digital coupon to the mobile device, and accesses a token server with the token identifier to obtain a current token value for the token. If the transaction location does not have a token assigned to it, then the coupon delivery system does not send a digital coupon to the mobile device. The coupon delivery system sends the server-generated token value with the digital coupon to the application on the mobile device, which renders an image of the digital coupon, such as a coupon barcode, along with the server-generated token value(s) for the token assigned to the current transaction location. The coupon delivery system also can mark the digital coupon sent to the mobile device as redeemed when the coupon is sent to the mobile device.

If the server-generated token value rendered with the digital coupon matches the token-generated token value displayed on the retailer's token, then the match validates the digital coupon. Such a comparison of the server-generated token value with the token-generated token value can be done by machine, e.g., computer. The comparison can also be performed by a person, such as a cashier at a retailer, who simply compares the token value on the face of the digital coupon to the current token value from the retailer's token to ensure that the numbers match. The result of the comparison can be provided as an input to a point-of-sale machine. The result of the comparison can be used by a cashier to refuse to accept the coupon. If the tokens match, then the retailer can accept the digital coupon.

The token implements technology called a time-varying, non-predictable code. A token generates a current token value, which changes over time. The current token value is generated using one or more predetermined static variables, one or more dynamic variables such as the current time, and a predetermined algorithm, such as described in U.S. Pat. No. 4,720,860. The current token value is generally a number in a sequence of numbers, but which can be mapped to other data. Thus, the current token value may include, for example, i) a string of numbers and/or characters, and/or ii) image(s), and/or iii) word (s), or similar data. Two separate computers or devices, using local information for the current time and the predetermined static variable (shared by the two computers or devices) and the predetermined algorithm (shared by the two computers or devices), generate the current token value. The two non-predictable codes generated by the two separate computers or devices are compared to determine if there is a match. The fact that two separate computers or devices generate the same current token values at the same time, which are generated based on a secret (e.g., the static variable and/or the predetermined time-dependent algorithm) which is both shared between the devices and associated with a source, the recipient of the content has assurance that the content received at the time of the transaction is authorized by the source of the content. The content delivery system determines which time-varying code to use to generate a current token value to present based on the transaction location determined based on information received in the request from the mobile device.

In one example implementation, a token that generates time-varying token values can be a SecureID token assigned to the retailer. The coupon issuer or coupon delivery system also has a computer system that has the same information as the token and generates matching time-varying token values. The coupon issuer or coupon delivery system can provide a token authorized by the coupon issuer to retailers and can have a server computer that provides, given a transaction location such as a geographic location or an identifier of a retailer, a current token value for the token.

Such a computer system enables a retailer who redeems a digital coupon presented on a consumer's mobile device to be assured that the digital coupon is authorized by the coupon issuer, and that the retailer will be properly reimbursed for the discount which the retailer gave to the consumer. If the coupon delivery system marks a digital coupon as redeemed as soon as the digital coupon is displayed, then the CPG company has data indicating that the digital coupon likely was presented by a consumer to a retailer that has a token and is authorized to redeem coupons.

If, for some reason, the consumer does not use the coupon or if the retailer does not honor the coupon, then the consumer can enter an input on the mobile device, such as pressing a button on a touchscreen displaying the digital coupon, which in turn causes the application on the mobile device to prompt the consumer to enter the current token value from the retailer's token. If the token values match, then the coupon can be unredeemed. If the token values do not match, then the coupon remains redeemed.

From the perspective of a CPG company, the CPG company can know how many times a coupon was viewed or presented for redemption in a specific physical location and can match that information against any claims made by the retailer for reimbursement.

From the perspective of a retailer, so long as the retailer checks to ensure that a current token value from a token received from the coupon issuer matches a current token value as displayed on the face of the coupon on a mobile device, the retailer has assurance that the digital coupon is valid, and that the CPG company will reimburse the retailer if the retailer accepts the digital coupon.

The computer system also provides a simple way for a consumer to reverse the process if the retailer does not redeem the coupon. The computer system can track such information to reduce fraud.

In one embodiment, a single retailer location with multiple cash registers or other point of sale devices can have a set of synchronized tokens, instead of unique tokens for each point of sale device, installed at the retailer's location so that all of the tokens display the same token value at any given time.

For the CPG company to increase certainty that the retailer actually sold the individual items for which the discounts were applied, the retailer can be asked to deliver, via batch or real-time data feed, the details of all transactions (products purchased by the consumer) so that the CPG company can reconcile these details against the coupon redemption records.

For the CPG company to increase certainty that the consumer was present at the point of sale system at a retailer before the coupon was marked as redeemed, the system can require consumers to take an extra step to confirm that the consumer interacts with the point of sale system. In one implementation, a secondary token can be placed near the point of sale system which displays a number or QR barcode or other value. The value of the secondary token can change at regular intervals. After confirming the consumer's location and obtaining a primary token value as described above, but prior to displaying the digital coupon with the primary token value, the application displaying the digital coupon can prompt the consumer to enter the secondary token value, such as by taking a picture of the secondary token or by entering data indicating the secondary token value. The application can then connect to a server to confirm the secondary token value for the specific location. If there is a match with the secondary token, then the application displays the digital coupon on the mobile device. The use of a secondary token ensures that the consumer is present at the point of sale prior to the coupon being marked as redeemed.

The secondary token value also can be rendered on an internet-connected point of sale system and the application on the mobile device can prompt a consumer to enter the secondary token value manually prior to the application displaying the digital coupon and the primary token value.

The secondary token value also can be a static barcode or number instead of a barcode or number dynamically displayed by a token. In this case, a server can simply check whether the static secondary token value was correct for the given physical retail location.

The secondary token also can be data exchanged via radio frequency between the point of sale device or other device of the retailer and the mobile device (and application) displaying the coupon, for example by using a Bluetooth beacon, NFC tag, RFID tag, or similar device. In this implementation, the radio frequency device exchanges data with the application running on the mobile device in place of the consumer taking a specific action with the secondary token. If the information received by the application from the radio frequency device matches the secondary token value expected from the token server for the specific location, then the digital coupon is displayed along with the primary token value.

The operation of the application can vary by store location, such that the secondary token is used in some retail locations but not in others. This implementation of the application can be useful when a digital coupon is issued by a retailer because, so long as the consumer is in the retailer's store, the coupon can be validated by the primary token alone.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

BRIEF DESCRIPTION OF THE DRAWINGS

FIG. 2 is an illustration of an example implementation of database tables for associating promotions, user profiles and tokens.

DETAILED DESCRIPTION

The following section describes an example operating environment for implementing a computer system which validates that digital content presented through a computing device to a recipient is authorized by a source of that digital content. This example operating environment is described in the context of delivering generic digital coupons to a mobile device and presenting generic digital coupons through the mobile device to a point of sale computer at a retailer. It should be understood that such a computer system can be applied to many different types of digital content that can be presented to a recipient computer system through a mobile device, where the recipient wants to determine that the digital content as presented is authorized by the source of that digital content. Further examples of such digital content include, but are not limited to generic digital coupons, serialized digital coupons, digital representations of loyalty cards, reward certificates, gift cards, digital tickets to venues or for travel or other places where tickets are used, or digital representation of value or liability. It also should be understood that the computing device from which the digital content is presented can be any kind of computing device through which the digital content can be presented to a recipient. For example, for digital content such as digital coupons, such content can be presented through a desktop computer while accessing an online store, in which case the online store is a recipient.

Figure 1:
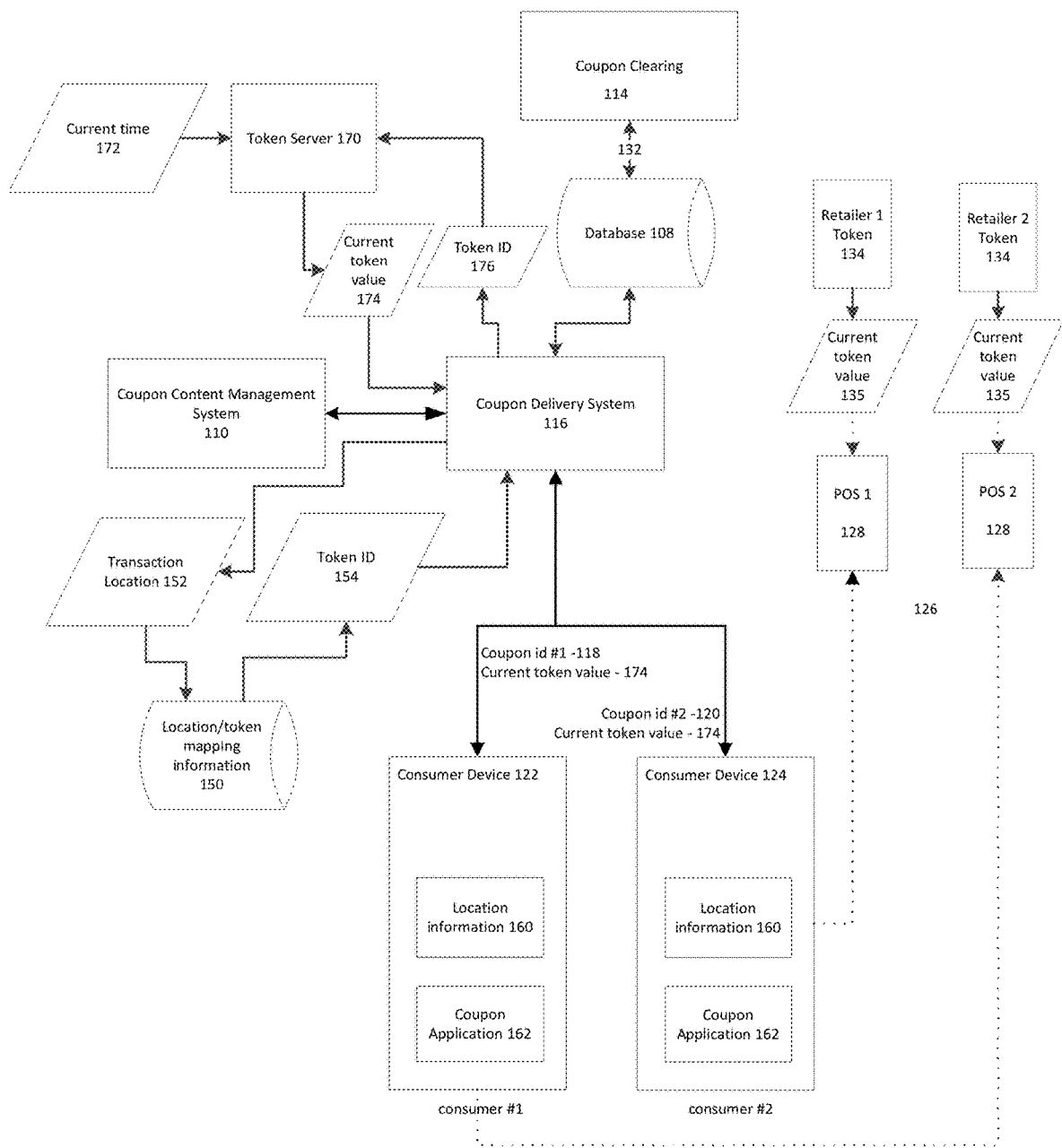
FIG. 1 is a block diagram of an example computer system which validates that digital content presented on a mobile device is authorized by a source of that digital content.

Referring to FIG. 1, a coupon delivery system for delivering generic digital coupons includes a database 108. This database, an example of which is described in more detail below in connection with FIG. 2, associates user profiles with promotions, such as digital coupons, and promotion identifiers. The coupon delivery system is connected to a coupon content management system 110. The coupon content management system 110 includes various media that is used to generate a rendering of an instance of a promotion, such as a digital coupon, such as graphics, text, and the like. Such information generally is associated with a promotion identifier for each promotion. A coupon delivery system 116 uses the database 108 to determine which instances of promotions to deliver to consumers, and their associated promotion identifiers, and uses coupon content management system 110 to provide data, such as media and text, to deliver with promotion identifiers to a consumer device.

The coupon delivery system 116, database 108 and coupon content management system 110 can be implemented as one or more computer systems that are programmed to implement the functionality such as described herein. An example computer system that can be used is described in more detail below in connection with FIG. 6. In addition, the database 108 and coupon content management system 110 include databases of information that can be implemented using storage and a database management system, such as a commercially available relational database, object-oriented database or other structured data storage system.

The database 108, coupon content management system 110 and coupon delivery system 116 can be implemented for one or more retailers or manufacturers or other type of entity. In some implementations each entity may have its own database 108, coupon content management system 110 and content delivery system 116. Different entities may be responsible for managing the different systems 108, 110 and 116.

The coupon content management system 110 can provide the data representing coupons (such as images and text) to the coupon delivery system 116 over a computer network. Similarly, the database 108 can be accessible to the coupon delivery system over a computer network. Alternatively, one or more of the systems 108, 110 and 116 can reside on the same computer system.

As described in more detail below in connection with FIG. 2, the database 108 maintains information associating promotion identifiers for promotions with user profiles for consumers, and information about promotions. Various operations can be made available in the coupon delivery system 116 to add, modify and remove associations between user profiles, promotions and promotion identifiers, such as described in U.S. Pat. No. 9,015,277, hereby incorporated by reference.

For digital coupons, the coupon delivery system 116 can deliver different digital coupons with coupon identifiers, e.g., coupon identifier #1 118 and coupon identifier #2 120, to consumer devices 122, 124 (e.g., consumer #1 and consumer #2) through multiple channels, e.g., text messaging, email, an application on a smart phone or other device, a digital payment wallet on a smart phone or other device, and social media. In some implementations, a delivered instance of a digital coupon has a coupon identifier that uniquely identifies the coupon as related to a particular promotion and a particular consumer, and optionally other information, and typically is rendered as a barcode on the consumer device. However, the digital coupons also can be generic in the sense that different instances of a digital coupon delivered to different consumer devices include the same coupon identifiers. In the example described below, the digital coupon can be a generic digital coupon because there is no communication between the point-of-sale device and any centralized service to validate a serialized coupon.

While FIG. 1 only shows one consumer device 122, 124 per consumer, there can be multiple consumers, each with multiple consumer devices. Each consumer device for a consumer can have multiple channels through which coupons can be delivered, and the channels available on all of the consumer devices can be the channels available for that consumer. As an example, a consumer may have email and web access on a desktop computer, an application and text messaging and web access on a mobile device. Such devices generally are implemented using a form of computing device such as described below in connection with FIG. 6.

A consumer device that is a mobile device generally includes a source of location information 160 and a coupon application 162. The coupon application 162 is a computer program running on the consumer device that configures the consumer device 122, 124 to communicate with the coupon delivery system to access digital coupons through the consumer device and present the digital coupons at points of sale. The selection of a digital coupon can be dependent on the location information 160.

To support validation of digital coupons or other promotions to be presented to a retailer at a point of sale through the consumer device, each point of sale system 128 has associated with it a token 134, such as a SecureID token, that has been given to the retailer by the coupon issuer (such as a manufacturer) or coupon clearing service. This token can include a hardware device, or software or data delivered to a computer including data defining a token, which is assigned to a specific point of sale of a retailer.

Information that maps token identifiers for tokens 134 to transaction locations to which those tokens are delivered is stored in a manner accessible to the coupon delivery system 116 as indicated at 150. Given a transaction location 152, this information can be used to obtain one or more token identifiers 154 corresponding to that transaction location.

A token generates a time-varying, non-predictable code. In other words, a token generates a current token value at intervals of time, where that current token value changes over time. The current token value is generated using a predetermined static variable, a time dependent dynamic variable and a predetermined algorithm. Token values may include, for example, i) a string of numbers and/or characters, and/or ii) image(s), and/or iii) word (s), or similar data. Two separate computers or devices, using local information for the current time and the predetermined static variable (shared by the two computers or devices) and the predetermined algorithm (shared by the two computers or devices), generate the current token value. The two non-predictable codes generated by the two separate computers or devices are compared to determine if there is a match. The fact that two separate computers or devices generate the same current token values at the same time, which are generated based on a secret (i.e., the static variable and the predetermined time-dependent algorithm) which is both shared between the devices and associated with a source, the recipient of the content has assurance that the content received at the time of the transaction is authorized by the source of the content. The content delivery system determines which time-varying code to present based on the transaction location determined based on information received in the request from the mobile device.

In one implementation, such a token 134 generates a token value at fixed intervals of time using a built-in clock and a factory-encoded seed, typically a random key associated with and unique to the token. The random key is different for each token. The interval can range from a few seconds to a few minutes, but for a digital coupon application would typically be in the range of two (2) minutes to five (5) minutes. The random key for a token is loaded into a token server 170 after the token is delivered to a retailer. Given a current time, the token produces a token value as a function of the random key and the current time. The current token value is generally a number in a sequence of numbers, but which can be mapped to other data. Thus, the current token value may include, for example, i) a string of numbers and/or characters, and/or ii) image(s), and/or iii) word (s), or similar data. The token server 170, given a current time 172, also can generate a token value 174 corresponding to each token for which it has the random key in its database. The token server 170 is used at the time a coupon is to be redeemed to generate a token value to be presented with the coupon.

An example implementation of a token server is an RSA SecureID token server, modified so as to provide a current token value in response to a current time and a token identifier. The coupon delivery system 116 provides the token server 170 with a token identifier 176, and the token server provides a token value 174 for the corresponding token based on information in its database and given the current time 172.

When presented at the point of sale, the server-generated current token value presented with the digital coupon (702) is validated against a current token value generated by the token 134 at the point of sale at the time of the transaction. In one implementation, when the coupon application 162 requests display of a digital coupon from the coupon delivery system 116, the coupon application 162 sends data to the coupon delivery system 116, from which a transaction location is determined. Given the transaction location 152 determined from the information from the consumer device, the coupon delivery system determines one or more token identifiers 154 from the mapping information 150. The coupon delivery system 116 provides the token identifier 176 to the token server 170. Given the token identifier 176 and the current time, the token server generates the current token value 174 corresponding to that token. The coupon delivery system 116 sends the server-generated current token value 174 along with the digital coupon to the consumer device, and marks that digital coupon as redeemed at the current transaction location in the database 108.

The coupon application 162 receives the server-generated current token value and presents it along with the digital coupon to be presented, for example by displaying the token value (702) along with, or as part of, a barcode representing the digital coupon. After instances of digital coupons are delivered to a consumer over the communication channels for that consumer, the consumer can present 126 one of the instances of a digital coupon at a point of sale system 128 in connection with a transaction.

There are a variety of mechanisms through which the digital coupon and server-generated current token value can be presented at the point-of-sale system 128. For example the coupon identifier for the digital coupon can be rendered as a barcode which is presented on a display at the point of sale, to be read either by a machine or an individual from the consumer device. As another example, the coupon identifier and/or server-generated token value can be conveyed to a point of sale device through other techniques, such as radio transmission over WiFi, Bluetooth, NFC or other connection.

At the point of sale, a determination is made whether the token-generated current token value 135, presented by the retailer's token, matches the server-generated current token value 174, presented by the consumer device. Such a determination can be made by an individual such as a cashier, in which case a cashier can simply inform a consumer whether the coupon will or will not be accepted. The determination can be made by a machine which, in response to making the determination, can provide an indication of the result to the cashier, consumer or program on the point of sale device. In response to an input indicating that the token-generated current token value and the server-generated current token value as presented on the mobile device match, a point of the sale device validates the digital coupon for use with the transaction.

In some implementations, it may be useful to have multiple values for the server-generated current token value, such as the next, in time, two, three or four token values generated by the token. This is because, by design, the token-generated current token value will be changing over time, and thus the server-generated token value that is presented on the mobile device might not match the token-generated current token value after a short period of time. In other words, between the time a transaction begins, and the server-generated current token value is requested by the mobile time, and the time the content, such as the digital coupon, is presented, the token-generated current token value could change to the next value. By accessing and presenting multiple server-generated token values, e.g., the current value and next value, and/or by accessing multiple token-generated token values, e.g., the previous value, the current value, the next value, then a transaction can be validated by a match between any pair of server-generated token value and token-generated token value. Similarly, if the point of sale system is connected to the token server, the point of sale system can collect a few of the prior numbers to compare against.

After determining that a digital coupon is valid, the point of sale system 128 can apply the promotion to the transaction. The point of sale system 128 can collect and store information about a presented coupon and the associated transaction.

A coupon clearing system 114, among other things, can process various information about the redeemed coupons from the database 108, and can provide reports of such information to various parties, for example to determine reimbursements. The coupon clearing system 114 and the database 108 may be local or remote to each other, and typically are connected over a computer network, such as the internet or a private wide area or local area network. They also may all reside on the same computer. For the present invention, it is assumed that the systems at the point of sale, such as cash registers, computer systems and the like, do not have direct or real-time access available to the coupon clearing system for the purpose of validating whether any presented coupon is valid. As described above, such access may be unavailable either due to the lack of physical or logical network connection to a coupon clearing system or the lack of integration with the coupon clearing system for the purpose of validating coupons.

While FIG. 1 shows two point of sale systems, there can be many point-of-sale systems. A retailer can have multiple point-of-sale systems in a single location. This system accommodates any number of retailers, with any number of locations, with any number of point of sale systems in each location. The point of sale system generally is in the form of a cash register, or tablet computer, or desktop computer, programmed specifically to perform purchasing transactions and track information about purchasing transactions, and generally includes one or more devices for inputting purchasing information such as a barcode scanner, credit card reader (magnetic strip reader) and the like.

The coupon clearing system 114, coupon delivery system 116 and point of sale system 128, token server and consumer devices 122 and 124 also typically are implemented using one or more computing devices such as described below in connection with FIG. 6, which can be further specialized as described above to be computing devices with specific form factors as discussed above.

Given this context, an example implementation will be described in more detail in connection with FIG. 2. Referring to FIG. 2, an example implementation of database tables used to store information about tokens, promotions and consumers, will now be described.

A first table 800 stores user profiles. Each user profile has a user identifier 802 and various data fields associated with it. Such data fields, in this example, include information about a consumer such as, a name 804, address 806, city 808, zip 810, and other information 812. This example is merely illustrative and not limiting as such a database can have multiple structures and tables for storing various information about consumers.

A coupon table 840 provides information about promotions, e.g., digital coupons. For example, a promotion identifier 842 (also called herein an ICUID, for internal coupon unique identifier) identifies a promotion. This promotion identifier is generally unique per promotion for a source of promotions, such as a retailer or manufacturer. Various information about the promotion can be stored, such as a start date 844, end date 846, presentation and use information 848 and any other information 850. This example is merely illustrative and not limiting as such a database can have multiple structures and tables for storing various information about promotions.

Another table 860 associates consumers with promotions by associating the user identifier for the consumer with the promotion identifier or ICUID for the promotion. In particular, for each promotion associated with a consumer there is a row that includes the user identifier 862 and the promotion identifier 864. This table can include use and redemption data 866 for the promotion for the user. This example is merely illustrative and not limiting as such a database can have multiple structures and tables for storing information associating user profiles with promotions.

A coupon identifier table 880 then is used to associate coupon identifiers, or "coupon ID", which can be rendered as barcodes, to promotions that are associated with consumers. In particular, the coupon identifier table associates a promotion identifier 882 (e.g., 842 in table 840) with a coupon identifier (coupon ID) 886, such as a barcode, for the instance of the coupon sent to the consumer. The coupon identifier is unique per consumer per promotion. In this example implementation, the use and redemption information is tracked per user per promotion in table 860, which allows multiple instances of the same promotion to be delivered to the same consumer with different coupon identifiers. This example is merely illustrative and not limiting as such a database can have multiple structures and tables for storing information associating promotion identifiers with coupon identifiers.

The foregoing information can be stored in the database 108 and accessible to the coupon delivery system 116.

Information about tokens (e.g., 150 in FIG. 1) can be stored in a token information table 890. This data may reside in a separate database 150 or the database 108 or in another database or storage system. Preferably, such information is stored in a manner to facilitate access to a token identifier given a location. The token information table includes, for each token, a token ID 892, such as its serial number, and a transaction location 898, which is data identifying a location where transactions occur and at which the token is located. For example the transaction location can be data that represents a geographical location, or data that identifies a retailer. Other information that can be stored includes, but is not limited to, a type 894 of the token. The type can indicate, for example, whether the token is unique or is part of a group of synchronized tokens at the location. Other information that can be stored can include a retailer ID, which is an identifier 896 of the retailer to which the token has been delivered. The retailer ID can be used to access other database tables that store information about retailers and their store locations. Yet other data 899 also can be stored. Such other information can include, for example, information about a kind of time-varying, non-predictable code used by the token.

The foregoing example is merely one way of storing information about users, promotions, and tokens.

Given such an example implementation, an example implementation for operations for delivering promotions to consumer devices to allow validation using tokens will now be described in connection with FIGS. 3-5 and 7.

Figure 3:
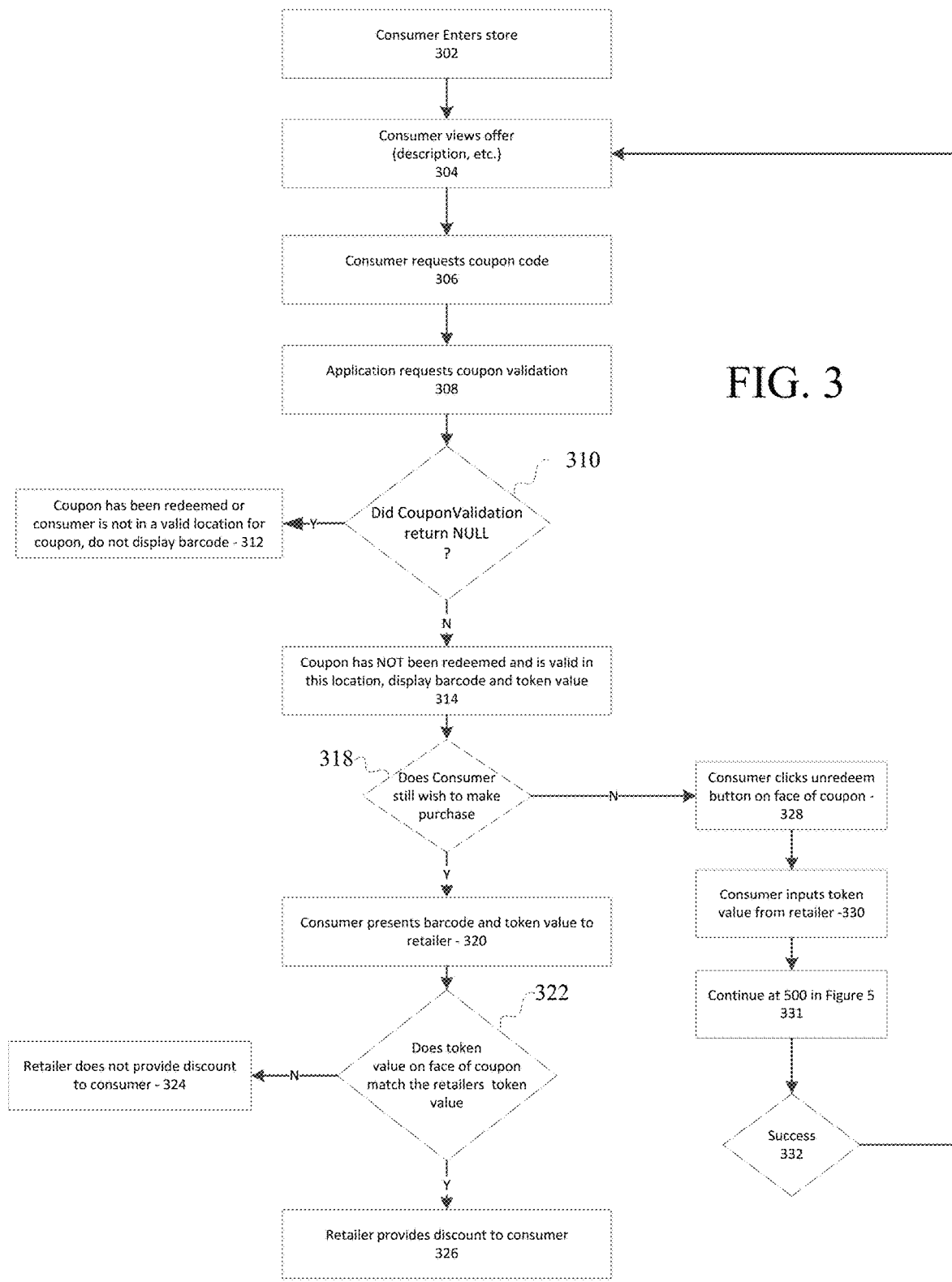
FIG. 3 is a flow chart of an example implementation of a transaction.

In FIG. 3, an example implementation of an overall process of a computer system such as shown in FIG. 1, from the perspective of a consumer device, will now be described. This process begins at step 302 when a consumer enters a retail location. The consumer opens the coupon application running on a mobile phone ("mobile app") to view an offer description, terms and conditions, images, etc., as indicated at step 304. In this example implementation, step 304 is not location dependent. When it is time for the consumer to present the digital coupon the retailer, the consumer clicks a button at step 306 in the mobile app to request the actual digital coupon, such as a code or barcode representing the digital coupon. At 308, in response to that input, the mobile app sends a signal, such as a message via the internet, to the coupon delivery system 116.

The coupon delivery system determines whether the digital coupon is valid and returns a value indicating the result of such a determination. For example, it may return a value for a variable "CouponValidation" which may be Null if the coupon is not valid. For example, it may return a non-null value for a variable "CouponValidation" and return a digital coupon, such as represented by a barcode, and a server-generated current token value based on the location of the consumer device.

The determination of the validity of the digital coupon can be based on one or more factors, an example implementation of which is described in more detail below in connection with FIG. 4. For example, the coupon delivery system can consult the database 108 to determine if the digital coupon has been redeemed. The coupon delivery system can determine through database 108, and using the location information 160 from the mobile device, whether the digital coupon can be presented at the consumer's location. The coupon delivery system also can conclude that the digital coupon is not valid in a particular location, and not deliver a digital coupon, if no token can be found to correspond to the current transaction location. If the coupon delivery system determines the digital coupon is valid, then the coupon delivery system obtains a current token value for a token identifier corresponding to the consumer's current location, from the token server (170), and the coupon delivery system obtains a barcode or other representation of the digital coupon from the coupon content management system (110). The coupon delivery system also can mark the digital coupon as redeemed in database 108.

If the coupon delivery system returns a NULL value for CouponValidation, as determined at 310, then the mobile app does not present the digital coupon, as indicated at 312.

If the coupon delivery system returns a non-null value for CouponValidation, as determined at 310, indicating that the digital coupon is valid, then the mobile app presents the digital coupon on the consumer device, such as by displaying the barcode, as indicated at 314, along with the server-generated current token value.

Figure 7:
FIG. 7 is an example graphical user interface on a mobile device.

If the consumer still wishes to make the purchase, as indicated at 318, the consumer device presents (320) the digital coupon at the point-of-sale system, along with the server-generated token value (such as shown at 700 and 702, respectively, in the example user interface in FIG. 7), such as by placing the display of the consumer device before a scanning device, or showing the display of the consumer device to a cashier. At 322, the server-generated current token value (702) from the consumer device is compared (322) with a token-generated current token value from the retailer's token (134 in FIG. 1). Such a comparison can be performed by the cashier. If the token-generating current token value from the retailer's token 134 matches the server-generated current token value presented at 702, then, at step 326, the digital coupon is validated and the retailer can provide the discount to the consumer.

If, at 318, the consumer no longer wishes to make the purchase, the consumer can initiate a process within the mobile app on the consumer device to mark the digital coupon as unredeemed, with the consent of the retailer. If the token values match, then the coupon can be unredeemed. If the token values do not match, then the coupon remains redeemed. In FIG. 3, the consumer, who is viewing the digital coupon (700) with the barcode, server-generated current token value (702) and unredeem button (704), as displayed by the mobile app on the consumer device, clicks (328) on an "unredeem" button 704. In response to user input with respect to the unredeem button, the mobile app can prompt the consumer to input a current token value from the retailer's token 134. The consumer requests the token-generated current token value from the retailer, and inputs 330 the value to initiate unredeeming the digital coupon. Further details of this example implementation of unredeeming (331) a digital coupon are described below in connection with FIG. 5. If unredemption is successful as indicated at 332, the process can return to step 304 to view the offer again.

Figure 4:
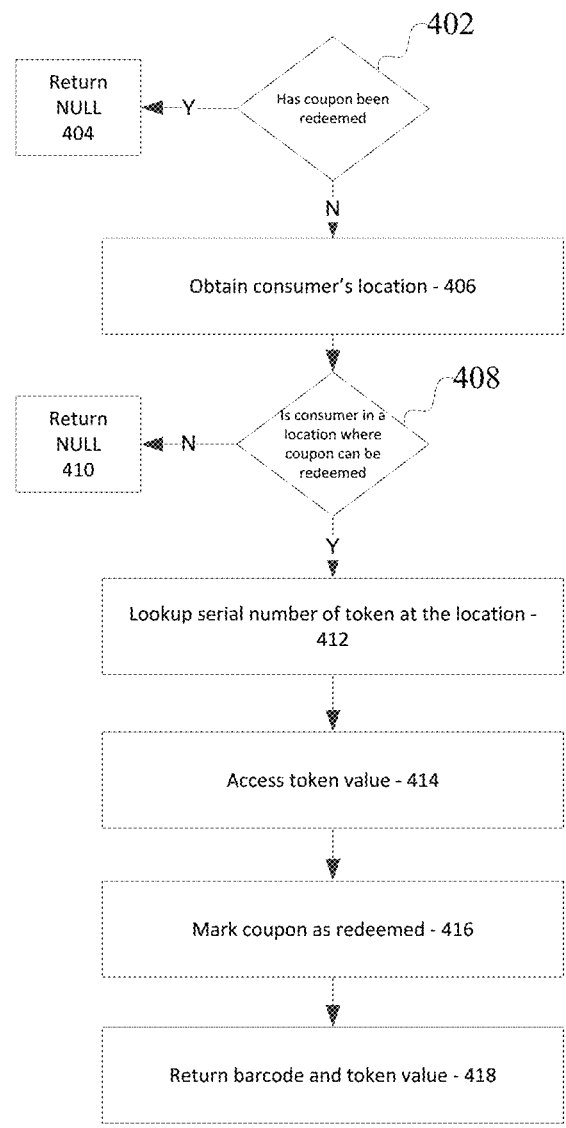
FIG. 4 is a flow chart of an example implementation of redeeming a coupon.

Turning now to FIG. 4, an example implementation of operation of the coupon delivery system 116 in validating a request for a digital coupon and providing a server-generated current token value with a valid digital coupon will now be described in more detail. Such a process can be invoked, for example, in response to the coupon application on a mobile device requesting a digital coupon, such as at 308 in FIG. 3.

The coupon delivery system determines, at 402, if the digital coupon has been redeemed. If the digital coupon has been redeemed, it returns (404) a NULL value for "CouponValidation" and the digital coupon is not displayed by the consumer device. If the digital coupon has not already been redeemed, then the coupon delivery system obtains (406) the consumer's location. If the consumer is in a location other than where the digital coupon can be redeemed, then the coupon delivery server returns (410) a NULL value for "CouponValidation", and the digital coupon is not displayed by the consumer device. Otherwise, the coupon delivery system continues on to 412 and looks up an identifier for the token corresponding to a transaction location determined based on the location information received from the consumer device. For example, the coupon delivery system can obtain a token identify using stored information 150. The coupon delivery system accesses (414) a server-generated current token value for the identified token from the token server 170. The coupon delivery system then marks the digital coupon as redeemed at 416 and returns the server-generated current token value and data representing the digital coupon, such as a barcode, at step 418 to the mobile application.

Figure 5:
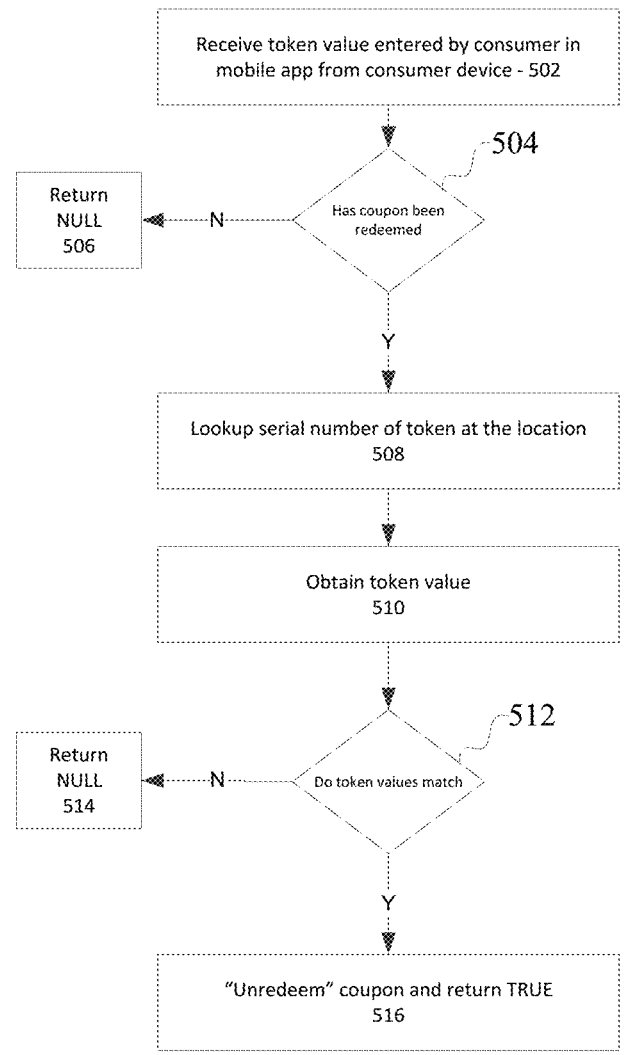
FIG. 5 is a flow chart of an example implementation of unredeeming a coupon.

Turning now to FIG. 5, an example implementation of an operation to unredeem a coupon will now be described in more detail. Such a process can be invoked in response to the coupon application on a mobile device receiving a user input with respect to the unredeem button (704) and inputting a token-generated current token value from the retailer's token, such as at 330 in FIG. 3.

In response to the consumer's input of the retailer's token value at 330 in FIG. 3, the retailer's token value is delivered by the consumer device and received 502 by the coupon delivery system 116. The coupon delivery system checks whether the digital coupon is redeemed, at 504, for example by checking database 108. If the digital coupon has not been redeemed, then the coupon delivery server will return such an indication, such as a NULL value for a "Coupon Unredeemed" variable, at 506, in response to which the mobile application on the consumer device can take no action, or, for example, indicate to the consumer that the digital coupon was never redeemed. If the digital coupon has been redeemed, then, at 508, the coupon delivery system looks up an identifier of a token corresponding to transaction location derived from the location information provided by the consumer device.

Continuing onto 510, the coupon delivery system obtains a server-generated current token value corresponding to the determined transaction location. The coupon delivery system compares (512) the token-generated current token value as input by the consumer to the obtained server-generated current token value. (Alternatively, in lieu of steps 510 and 512, the coupon delivery system can provide the retailer's token value as entered by the consumer and determined token identifier to the token server, which can indicate whether the entered value is correct for the identified retailer token.) Generally, if the token values match, then the coupon can be unredeemed; if the token values do not match, then the coupon remains redeemed.

If the token values are not equal, then the coupon delivery server can return such an indication, such as a NULL value for the "Coupon Unredeemed" variable, as indicated at 514, in response to which the mobile application can take no action, or, for example, indicate that the coupon remains marked as redeemed. If the tokens are equal, then the coupon delivery server marks the coupon as unredeemed, as indicated at 516, and can return such an indication, such as a TRUE value for the "Coupon Unredeemed" variable, to the mobile application. In turn, the mobile application can return to step 304 (the step before the coupon barcode and security code have been requested).

Such techniques also can be used in combination with a validity checking wallet as described in U.S. Pat. No. 8,430,300. The match of the token values can be an input that allows the digital coupon to be marked as valid and displayed by the consumer device.

In an implementation in which the retailer is using a point of sale system that is connected to the internet or other computer network, the point of sale system can access a token server on the internet or other computer network to obtain the proper token-generated current token value for that transaction location and present the token-generated current token value directly on an output device of the point of sale system, thereby eliminating the physically separate token delivered to the retailer.

From the perspective of a CPG company, the CPG company can know how many times a coupon was viewed or presented for redemption in a specific physical location and can match that information against any claims made by the retailer for reimbursement.

From a retailer perspective, so long as the retailer checks to ensure that a current token value from a token received from the coupon issuer matches a current token value as displayed on the face of the coupon on a mobile device, the retailer has assurance that the digital coupon is valid, and that the CPG company will reimburse the retailer if the retailer accepts the digital coupon.

The computer system also provides a simple way for a consumer to reverse the process if the retailer does not redeem the coupon. The computer system can track such information to reduce fraud.

In one embodiment, a single retailer location with multiple cash registers or other point of sale devices can have a set of synchronized tokens, instead of unique tokens for each point of sale device, installed at the retailer's location so that all of the tokens display the same token value at any given time.

For the CPG company to increase certainty that the retailer actually sold the individual items for which the discounts were applied, the retailer can be asked to deliver, via batch or real-time data feed, the details of all transactions (products purchased by the consumer) so that the CPG company can reconcile these details against the coupon redemption records.

For the CPG company to increase certainty that the consumer was present at the point of sale system at a retailer before the coupon was marked as redeemed, the system can require consumers to take an extra step to confirm that the consumer interacts with the point of sale system. In one implementation, a secondary token can be placed near the point of sale system which displays a number or QR barcode or other value. The value of the secondary token can change at regular intervals. After confirming the consumer's location and obtaining a primary token value as described above, but prior to displaying the digital coupon with the primary token value, the application displaying the digital coupon can prompt the consumer to enter the secondary token value, such as by taking a picture of the secondary token or by entering data indicating the secondary token value. The application can then connect to a server to confirm the secondary token value for the specific location. If there is a match with the secondary token, then the application displays the digital coupon on the mobile device. The use of a secondary token ensures that the consumer is present at the point of sale prior to the coupon being marked as redeemed.

The secondary token value also can be rendered on an internet-connected point of sale system and the application on the mobile device can prompt a consumer to enter the secondary token value manually prior to the application displaying the digital coupon and the primary token value.

The secondary token value also can be a static barcode or number instead of a barcode or number dynamically displayed by a token. In this case, a server can simply check whether the static secondary token value was correct for the given physical retail location.

The secondary token also can be data exchanged via radio frequency between the point of sale device or other device of the retailer and the mobile device (and application) displaying the coupon, for example by using a Bluetooth beacon, NFC tag, RFID tag, or similar device. In this implementation, the radio frequency device exchanges data with the application running on the mobile device in place of the consumer taking a specific action with the secondary token. If the information received by the application from the radio frequency device matches the secondary token value expected from the token server for the specific location, then the digital coupon is displayed along with the primary token value.

The operation of the application can vary by store location, such that the secondary token is used in some retail locations but not in others. This implementation of the application can be useful when a digital coupon is issued by a retailer because, so long as the consumer is in the retailer's store, the coupon can be validated by the primary token alone.

It should be understood that the various implementations described above can be combined in various ways to enable different kinds of functionality for validating digital content delivered to a mobile device using the location of the mobile device and a token corresponding to the location at which the transaction is occurring.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well-known computing devices that may be suitable include, but are not limited to, personal computers, server computers, hand-held or laptop devices (for example, media players, notebook computers, tablet computers, cellular phones, mobile phones, smart mobile phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
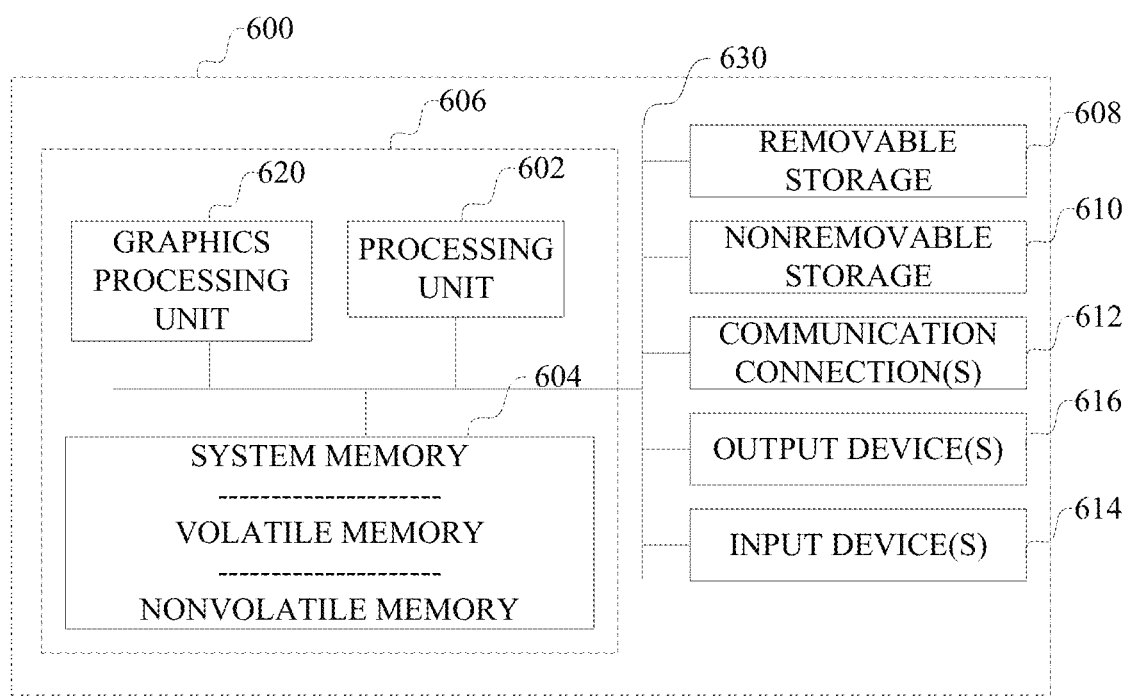
FIG. 6 is a block diagram of an example computer with which components of such a system can be implemented.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computing environment includes a computing machine, such as computing machine 600. In its most basic configuration, computing machine 600 typically includes at least one processing unit 602 and memory 604. The computing device may include multiple processing units and/or additional co-processing units such as graphics processing unit 620. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, computing machine 600 may also have additional features/functionality. For example, computing machine 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information at addressable physical locations from which the information can read by computing machine 600. Any such computer storage media may be part of computing machine 600.

Computing machine 600 may also contain communications connection(s) 612 that allow the device to communicate with other devices over communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and media that can transmit signals wirelessly, as acoustic, RF, infrared and other signals.

Computing machine 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here.

The various components in FIG. 6 are generally interconnected by an interconnection mechanism, such as one or more buses 630.

Such a system may be implemented using software, including computer-executable instructions and/or computer-interpreted instructions, such as program modules, being processed by a set of computers. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices It should be understood that the subject matter defined in the appended claims is not necessarily limited to the specific implementations described above. The specific implementations described above are disclosed as examples only.

What is claimed is:

1. A computer implemented process performed by a computer system including:
   a plurality of tokens associated with a source, wherein each token has a respective identifier and generates a current token value of a respective time-varying, non-predictable code for the token, wherein the respective time-varying, non-predictable code of the token comprises a sequence of token values generated based on at least respective secret information for the token shared between the token and a token server and on a time-varying value, wherein the current token value for the token at a current time is a function of the respective secret information for the token and the time-varying value, wherein the respective time-varying, non-predictable code and the respective identifier for each token is unique among the plurality of tokens, wherein each token is located at a different respective transaction location among a plurality of transaction locations, wherein each transaction location has a respective geographic location, and presents a human-readable representation of the current value of the token through a respective token output device at the respective transaction location;
   a database comprising computer storage storing location-to-token mapping information associating each transaction location among the plurality of transaction locations with the respective identifier for the respective token located at the transaction location;
   the token server connected to the database which generates, in response to a location input indicating a geographic location, a current token value for a token located at a transaction location corresponding to the geographic location indicated by the location input,
   a digital content delivery system computer connected by a computer network to the database and the token server, and
   a plurality of computing devices, wherein each computing device is located at a respective transaction location among the plurality of transaction locations and is operative to process transactions at the respective transaction location,
   wherein the plurality of computing devices and the plurality of tokens at the plurality of transaction locations do not have a computer network connection to the token server or digital content delivery system to validate digital content presented on mobile devices, the computer implemented process comprising:
   the digital content delivery system receiving a request, from a requesting mobile device among a plurality of mobile devices, the request including data indicating a geographic location of the requesting mobile device at a time of the request, the request further indicating a request for digital content originating from the source;
   in response to the request, the digital content delivery system determining a transaction location based on the geographic location of the requesting mobile device at the time of the request;
   the digital content delivery system access the location-to-token mapping information in the database using the determined transaction location to retrieve the respective identifier of the token located at the determined transaction location;
   the digital content delivery system accessing the token server using the retrieved respective identifier to obtain a current token value generated by the token server for the token associated with the determined transaction location, based on the time-varying non-predictable code for the token, using the secret information for the token stored at the token server and a current time accessible to the token server;
   the digital content delivery system transmitting the requested digital content and the token server-generated current token value to the requesting mobile device;
   the requesting mobile device receiving, from the digital content delivery system, the requested digital content and the token server-generated current token value;
   the requesting mobile device presenting the requested digital content and a human-readable representation of the token server-generated current token value through an output device of the requesting mobile device;
   the token at a current transaction location generating a current token value based on the time-varying, non-predictable code of the token, using secret information stored in the token and a current time accessible to the token;
   the token at the current transaction location presenting a human-readable representation of the token-generated current token value through the respective token output device;
   the computing device at the current transaction location receiving an input from an individual indicating whether the token-generated current token value as presented through the respective token output device matches the token server-generated current token value as presented through the output device of the requesting mobile device thereby indicating the digital content presented on the mobile device originates from the source.

2. The computer implemented process of claim 1, wherein each token generates a respective token value at fixed intervals of time using a built-in clock and a random key associated with and unique to the token.

3. The computer implemented process of claim 1, wherein the stored location-to-token mapping information in the database comprises, for each token, a respective token identifier, a respective geographic location of the token, and a respective identifier of an entity at the geographic location.

4. A computer system, comprising:
   a token server;
   a plurality of tokens associated with a source, wherein each token has a respective identifier and generates a current token value of a respective time-varying, non-predictable code for the token, wherein the respective time-varying, non-predictable code of the token comprises a sequence of token values generated based on at least respective secret information for the token shared between the token and the token server and on a time-varying value, wherein the current token value for the token at a current time is a function of the respective secret information for the token and the time-varying value, wherein the respective time-varying, non-predictable code and the respective identifier for each token is unique among the plurality of tokens, wherein each token is located at a different respective transaction location among a plurality of transaction locations, wherein each transaction location has a respective geographic location, and presents a human-readable representation of the current value of the token through a respective token output device at the respective transaction location;
   a database comprising computer storage storing location-to-token mapping information associating each transaction location among the plurality of transaction locations with the respective identifier for the respective token located at the transaction location;

wherein the token server is connected to the database and comprises a processing device and memory that processes computer program instructions to generate, in response to receiving a location input indicating a geographic location, a current token value for a token located at a transaction location corresponding to the geographic location indicated by the location input;

a digital content delivery system computer connected by a computer network to the database and the token server;

a plurality of computing devices, wherein each computing device is located at a respective transaction location among the plurality of transaction locations and is operative to process transactions at the respective transaction location;

wherein the plurality of computing devices and the plurality of tokens at the plurality of transaction locations do not have a computer network connection to the token server or digital content delivery system to validate digital content presented on mobile devices at the transaction locations;

wherein the digital content delivery system is operative to:

a. receive a request from a requesting mobile device, the request including data indicating a geographic location of the requesting mobile device at a time of the request, the request further indicating a request for digital content originating from the source, b. in response to the request, determine a transaction location based on the geographic location of the requesting mobile device at the time of the request, c. access the location-to-token mapping information in the database using the determined transaction location to retrieve the respective identifier of the token located at the determined transaction location, d. access the token server using the retrieved respective identifier to retrieve from the token server a current token value generated for the token associated with the determined transaction location, based on the time-varying non-predictable code for the identified token, using the secret information for the identified token stored at the token server and a current time accessible to the token server, and e. transmit the requested digital content and the token server-generated current token value to the requesting mobile device;

wherein the requesting mobile device is operative to:

a. receive the requested digital content and the token server-generated current token value transmitted from the digital content delivery system, and b. present the requested digital content and a human-readable representation of the token server-generated current token value through an output device of the requesting mobile device;

wherein the token at a current transaction location is operative to generate a current token value based on the time-varying, non-predictable code of the token, using the respective secret information stored in the token and a current time accessible to the token; wherein the token at the current transaction location is operative to present a human readable representation of the token-generated current token value through the respective token output device of the token; such that the token-generated current token value is presented through the respective token output device of the token of the current transaction location and the server-generated current token value is presented through the output device of the requesting mobile device at the current transaction location;

wherein the computing device at the transaction location is operative to receive an input indicating whether the token-generated current token value as presented through the respective token output device matches the token server-generated current token value as presented through the output device of the requesting mobile device thereby indicating to the computing device that the digital content presented on the mobile device was validated as originating from the source.

5. The computer system of claim 4, wherein each token in the plurality of tokens generates a respective token value at fixed intervals of time using a built-in clock and a random key associated with and unique to the token.

6. The computer system of claim 4, wherein the stored location-to-token mapping information in the database comprises, for each token, a respective token identifier, a respective geographic location of the token, and a respective identifier of an entity at the geographic location.

7. A computer system, comprising:

a token server;

a plurality of tokens associated with a source, wherein each token has a respective identifier and generates a current token value of a respective time-varying, non-predictable code for the token, wherein the respective time-varying, non-predictable code of the token comprises a sequence of token values generated based on at least respective secret information for the token shared between the token and the token server and on a time-varying value, wherein the current token value for the token at a current time is a function of the respective secret information for the token and the time-varying value, wherein the respective time-varying, non-predictable code and the respective identifier for each token is unique among the plurality of tokens, wherein each token is located at a different respective transaction location among a plurality of transaction locations, wherein each transaction location has a respective geographic location, and presents a human-readable representation of the current value of the token through a respective token output device at the respective transaction location;

a database comprising computer storage storing location-to-token mapping information associating each transaction location among the plurality of transaction locations with the respective identifier for the respective token located at the transaction location;

wherein the token server is connected to the database and comprises a processing device and memory that processes computer program instructions to generate, in response to receiving a location input indicating a geographic location, a current token value for a token located at a transaction location corresponding to the geographic location indicated by the location input;

a digital content delivery system computer connected by a computer network to the database and the token server;

a plurality of computing devices, wherein each computing device is located at a respective transaction location among the plurality of transaction locations and is operative to process transactions at the respective transaction location;

a plurality of mobile devices configured to communicate with the digital content delivery system and configured to request digital content from the digital content delivery system;

wherein the plurality of computing devices and the plurality of tokens at the plurality of transaction locations do not have a computer network connection to the token server or digital content delivery system to validate digital content presented on mobile devices;

wherein the digital content delivery system is operative to:

a. receive a request from a requesting mobile device, from among the plurality of mobile devices, the request including data indicating a geographic location of the requesting mobile device at a time of the request, the request further indicating a request for digital content originating from the source, b. in response to the request, determine a transaction location based on the geographic location of the requesting mobile device at the time of the request, c. access the location-to-token mapping information in the database using the determined transaction location to retrieve the respective identifier of the token located at the determined transaction location, d. access the token server using the retrieved respective identifier to retrieve from the token server a current token value generated for the token associated with the determined transaction location, based on the time-varying non-predictable code for the identified token, using the secret information for the identified token stored at the token server and a current time accessible to the token server, and e. transmit the requested digital content and the token server-generated current token value to the requesting mobile device;

wherein the requesting mobile device is operative to:

a. receive the requested digital content and the token server-generated current token value transmitted from the digital content delivery system, and b. present the requested digital content and a human-readable representation of the token server-generated current token value through an output device of the requesting mobile device;

wherein the token at a current transaction location is operative to generate a current token value based on the time-varying, non-predictable code of the token, using the respective secret information stored in the token and a current time accessible to the token;

wherein the token at the current transaction location is operative to present a human readable representation of the token-generated current token value through the respective token output device of the token;

thereby allowing an individual at the current transaction location to compare the token-generated current token value as presented on the respective token output device to the token server-generated current token value as presented through the output device of the requesting mobile device to determine whether the token-generated current token value matches the token server-generated current token value;

wherein the computing device at the current transaction location is operative to receive an input from an individual indicating whether the token-generated current token value matches the server-generated current token value, thereby indicating to the computing device that the digital content presented on the mobile device was validated as originating from the source.

8. The computer system of claim 7, wherein each token in the plurality of tokens generates a respective token value at fixed intervals of time using a built-in clock and a random key associated with and unique to the token.

9. The computer system of claim 7, wherein the stored location-to-token mapping information in the database comprises, for each token, a respective token identifier, a respective geographic location of the token, and a respective identifier of an entity at the geographic location.

* * * * *